United States Patent [19]

Heikal

[11] Patent Number: 5,702,185
[45] Date of Patent: Dec. 30, 1997

[54] HEAT FLOW TRANSDUCER

[75] Inventor: Morgan Heikal, Brighton, United Kingdom

[73] Assignee: P. A. Hilton Limited, Hampshire, United Kingdom

[21] Appl. No.: 287,815

[22] Filed: Aug. 9, 1994

[51] Int. Cl.$^6$ .............................. G01K 7/02; G01K 17/00
[52] U.S. Cl. .............................. 374/29; 374/43; 374/163
[58] Field of Search .............................. 374/29, 30, 43, 374/44, 16, 21, 27, 28, 163, 165, 183, 208; 136/203–205, 211, 212, 225, 229, 230, 200, 224

[56] References Cited

U.S. PATENT DOCUMENTS

| | | | |
|---|---|---|---|
| 3,225,549 | 12/1965 | Elfving | 136/204 |
| 3,525,648 | 8/1970 | Poppendiek | 136/229 |
| 3,552,185 | 1/1971 | Goode, Jr. et al. | 374/44 |
| 3,998,592 | 12/1976 | Pyle | 422/52 |
| 4,050,302 | 9/1977 | Haupin | |
| 4,197,738 | 4/1980 | Degenee | |
| 4,198,859 | 4/1980 | Holtermann | |
| 4,459,428 | 7/1984 | Chou | 136/205 |
| 4,465,895 | 8/1984 | Verner et al. | 136/211 |
| 4,553,852 | 11/1985 | Derderian et al. | |
| 4,647,221 | 3/1987 | Szabo | 374/30 |
| 4,687,881 | 8/1987 | Goslowsky et al. | 136/255 |
| 5,006,178 | 4/1991 | Bijvoets | 136/203 |
| 5,040,901 | 8/1991 | Suzuki | 374/183 |
| 5,168,339 | 12/1992 | Yokotani et al. | 136/203 |

FOREIGN PATENT DOCUMENTS

| | | | |
|---|---|---|---|
| 1 333 800 | 5/1962 | France. | |
| 57 086 729 | 5/1982 | Japan. | |
| 0183082 | 11/1982 | Japan | 136/230 |
| 61 050 384 | 3/1986 | Japan. | |
| 783 664 | 11/1980 | U.S.S.R. | |

*Primary Examiner*—William A. Cuchlinski, Jr.
*Assistant Examiner*—Andrew Hirshfeld
*Attorney, Agent, or Firm*—Nixon & Vanderhye P.C.

[57] ABSTRACT

A heat flow transducer comprises one or more thermoelectric cooler (TEC) devices mounted in a core of heat resistant material which is subjected to the heat flow to be measured. Multiple TECs are thermally in parallel and electrically in series.

15 Claims, 2 Drawing Sheets

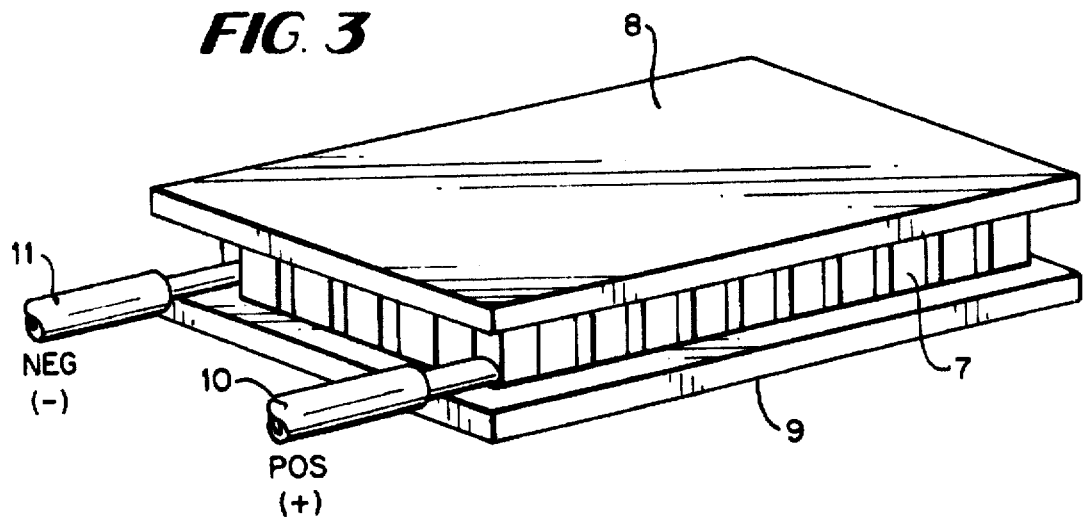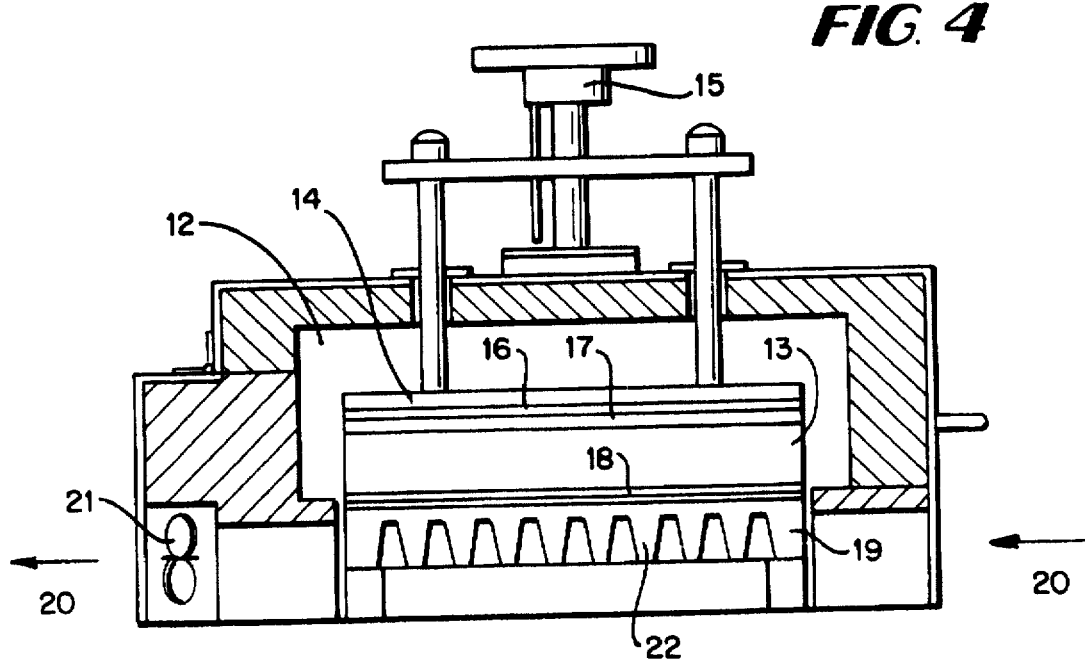

HEAT FLOW TRANSDUCER

BACKGROUND OF THE INVENTION

1. Field of the Invention

The invention relates to a transducer for the measurement of the rate of heat flow.

2. Discussion of Prior Art

Heat flux is proportional to the temperature difference across a thermal resistance which carries the heat. Conventionally, heat flux is determined by measuring much a temperature difference by means of differential. thermocouples or thermopiles fixed to the surfaces of a known thermal barrier. Transducers of this kind, if they are to be accurate, require careful design for each specific application and care in the disposition, interconnection and bonding of the temperature sensors to the surfaces of the thermal barrier. Satisfactory transducers are expensive because their design is inflexible and it is difficult to reproduce specific characteristics. The present invention seeks to provide an improvement.

SUMMARY OF THE INVENTION

According to the invention there is provided a heat flow transducer comprising a core of heat resistive material having opposed faces; two heat conductive plates in thermal contact with the opposed faces; one or more thermoelectric coolers set in to an aperture or respective apertures in the core so as to constitute one or more thermal resistances between the conductive plates in parallel with the core; and electrical interconnections to the thermoelectric cooler or coolers to derive an electrical response to a thermal flux through the transducer from one plate to the other.

A thermoelectric cooler (TEC) is a semiconductor device consisting of a matrix of semiconductor thermoelectric couples connected electrically in series and thermally in parallel. Application of electric current through the cooler cools one side with respect to the other and this allows forced extraction of heat from a component thermally in contact with the cold side to be dissipated from the hot side. Such devices are used in the temperature control of sensitive electronic devices, for example. Thermoelectric coolers are capable of being manufactured with consistent accuracy and their use in the manner according to the present invention provides a relatively inexpensive, accurate and sensitive heat flow transducer capable of flexible design.

Thermoelectric coolers have an electrical polarity which corresponds with a given thermal polarity. If current is passed through the device in a given direction the h,eat flow will be in a particular direction. Reversing the current reverses the heat flow. Similarly, it is found that in the passive use of the device as a sensor in accordance with the invention, if heat flows in a particular direction then electrical current is generated in a particular direction. Reversal of the direction of heat flow reverses the current. There may be only a single thermoelectric cooler in the transducer. Preferably, however, there is a plurality. It is envisaged that usually the thermoelectric coolers will be arranged in the core thermally in parallel in the same thermal sense. This is not necessary, however, since whichever the thermal sense of the TECs their terminals can be interconnected to give an additive serial electrical response.

Heat flow has been measured hitherto by means of thermopile type heat flux transducers. These are thin film devices which are fragile and relatively insensitive. Typically such transducers give an output in the range 0.006 to 3.5 uV/ (W/m$^2$). By comparison transducers made in accordance with the present invention are rugged and can have a sensitivity of the order of 64uV/ (W/m$^2$). However, high sensitivity may be accompanied by problems of accuracy and reproducibility. It is found in practice that errors may indeed appear if precautions are not taken. One such precaution is to ensure that the collective thermoelectric cooler area is a small fraction of the total transducer area. Preferably the radio of total transducer area to the collective thermoelectric cooler area is greater than 15:1. A more preferred figure is greater than 20:1.

It is possible to mount the thermoelectric coolers in cut-outs in the core. However, it preferred that the heat resistive material is a settable or curable fluid which is moulded around the or each thermoelectric cooler and allowed to solidify. For example, the heat resistive material may he silicone rubber or epoxy resin.

In order to ensure the absence of bubbles in the core it is preferred to carry out the moulding process under vacuum and in accordance with another aspect of the invention there is provided a method of making a heat flow transducer as described above including the steps of mounting the or each thermoelectric cooler with the said electrical interconnections in a mould, injecting or pouring the fluid heat resistive material in to the mould and allowing the heat resistive material to set or cure in a vacuum chamber.

The invention has application in the measurement of thermal conductivity of samples of material as used in the building industry, for example. Thus, another aspect of the invention provides such a measurement unit which includes a heat flow transducer as described above and comprising a heat insulated chamber, a mount within the chamber for mounting a specimen to be measured; heating means for supplying heat to one surface of the specimen; and cooling means for withdrawing heat from the opposite surface of the specimen, the said heat flow transducer being mounted in thermal contact with one of said surfaces of the specimen. There may be a loading plate for applying a determined compressional load to the specimen being measured.

BRIEF DESCRIPTION OF THE DRAWINGS

The Invention will further be described with reference to the accompanying drawings, of which:

FIG. 3 IS a perspective view of a thermoelectric cooler of the transducer of FIGS. 1 and 2: and FIG. 4 is a schematic cross-sectional diagram of a unit incorporating the invention for the measurement of the thermal conductivity of samples.

DETAILED DISCUSSION OF PREFERRED EMBODIMENTS

Figure 1:
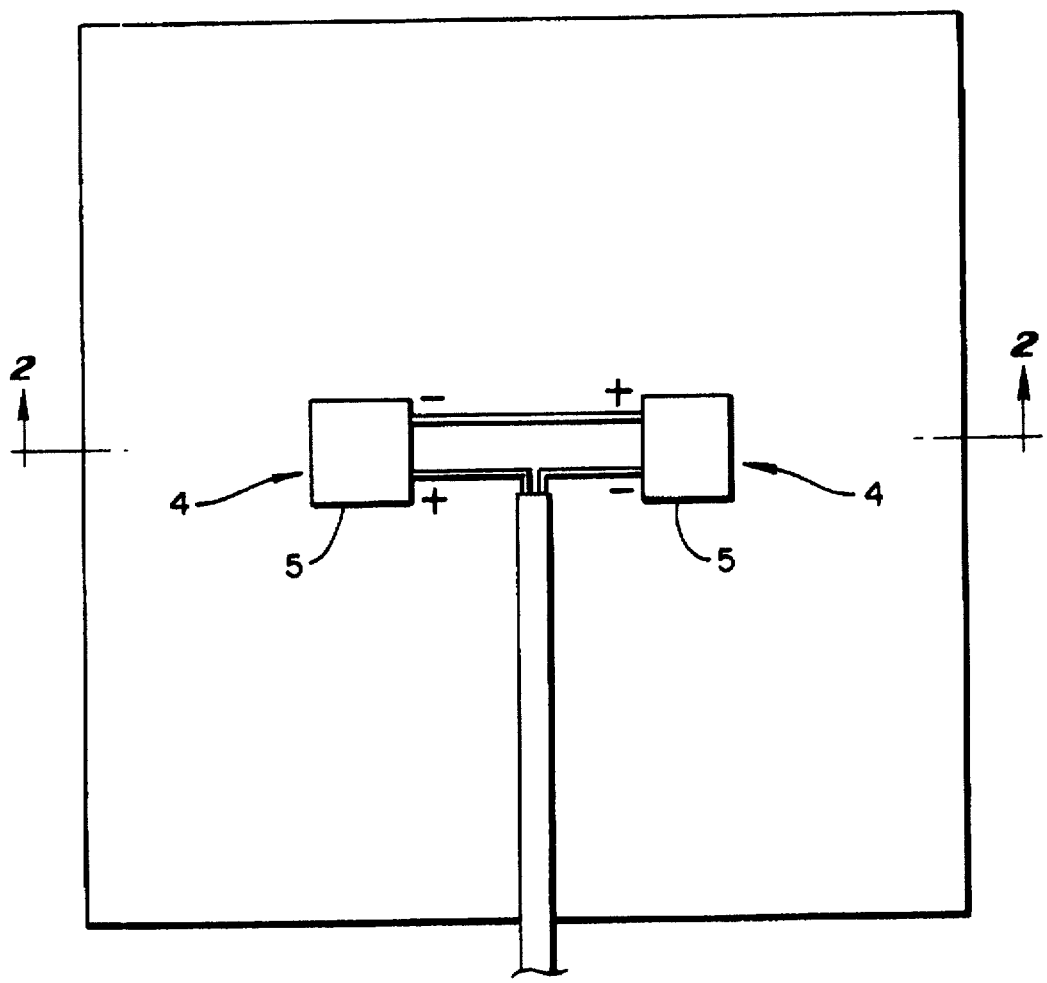
FIG. 1 is a plan view of a heat flow transducer in accordance with the invention.
Figure 2:
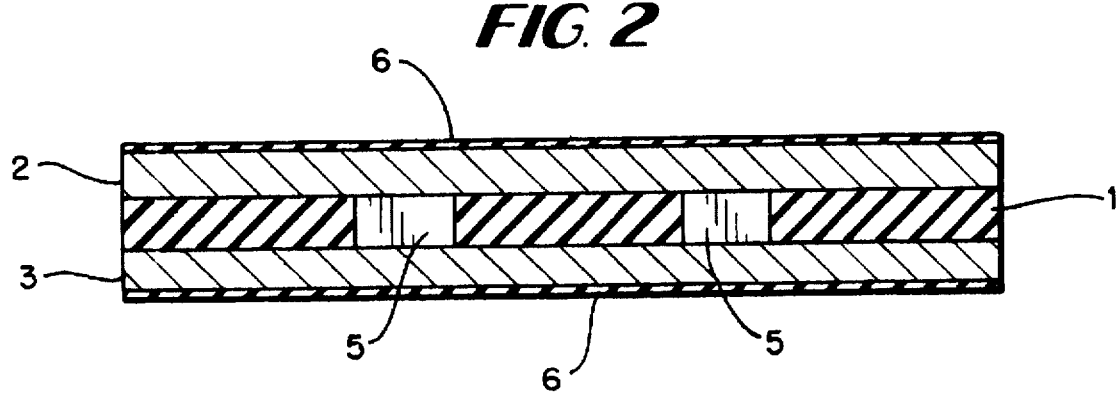
FIG. 2 is a cross-sectional view taken at II—II of FIG. 1.

Referring to FIGS. 1 and 2 the transducer is, in this embodiment, a square unit comprising a silicone rubber core 1 which constitutes a thermal barrier between a top aluminium plate 2 and a bottom aluminium plate 3 which contact respective flat surfaces of the core and sandwich it. At spaced positions 4 are provided respective thermoelectric coolers (TEC's) 5. The outside surfaces of the plates 2 and 3 are faced with silicone rubber 6. They are 6cm square in this embodiment.

In manufacture of the transducer the TECs 5 are electrically interconnected and supported in a mould which defines the shape of the core. Liquid silicone rubber is poured into the mould and allowed to set under vacuum, the mould being placed in a vacuum chamber. This ensures the expulsion of any bubbles.

The sensitivity of the transducer can be adjusted by varying the composition of the core material. Typically, the thermal conductivity of the silicone alone is approximately 0.27W/mK. This can be reduced considerably by mixing it with a bulking agent of powder or plastic beads with low conductivity. Increasing the ratio of this bulking agent to silicone will make the transducer more sensitive.

FIG. 3 shows a thermoelectric cooler which comprises an array 7 of semiconductor thermoelectric couples connected electrically in series and thermally in parallel between two ceramic plates 8, 9. The cooler has a positive terminal 10 and a negative terminal 11. When current 15 passed in the appropriate direction plate 8 is cooled with respect to plate 9. However, reversal of the current flow reverses the heat flow.

The thermoelectric coolers used in this example were 1 cm square TECs made by Marlow Industries under the designation MI 1060T.

The coolers 5 of the embodiment of FIGS. 1 and 2 are situated in the core 1 with their thermal polarities aligned (plate 8 uppermost, for example) and their terminals are connected electrically in series. It is found that heat applied to the transducer to flow from one plate to the other causes an electrical current to be generated by the thermoelectric coolers at a level according to the rate of heat flow. Additive connection of the TEC's in series enhances the sensitivity of the device.

Appropriate selection of the properties and dimensions of the core and metal plates and the disposition of the TEC's allows the heat flow to be shared predictably by the TEC's and their collective output is an accurate and consistent representation of the heat flow. In the embodiment shown the total transducer area is 36 sq cm and the collective TEC area is 2 sq cm. The ratio is therefore 18:1.

FIG. 4 shows a unit for measuring the thermal conductivity of a sample of material. The unit has a heat-insulated chamber 12 within which is supported a block 13 of the material to be tested. A loading plate 14 is operated by a hand-screw 15 to apply a determined compressional load to the block. An electric heater 16 heats a hot-plate 17 which applies heat to the block. Beneath the block Is mounted a heat flow transducer 18 of the kind described with reference to FIGS. 1 to 3 and of the same length and width as the block. Beneath the transducer is a cold plate heat-sink 19 from which heat is withdrawn by means of an air-flow 20 induced by a fan 21. Fins 22 depend from the heat-sink in to the air-flow.

Thermocouples are provided to measure the temperature at the upper and lower faces of the block 13. Thermocouple and heat flow transducer signals are passed to a four-channel temperature controller/indicator situated on a main panel (not shown) of the unit. The unit is supplied in use with a calibration equation determined by tests performed with samples of known thermal conductivity. These reference samples have had their thermal conductivity found by a direct method to British Standards. The calibration equation enables the user to easily calculate the thermal conductivity of the material under test.

In addition, an RS232 serial socket enables these signals to be passed to a computer, via the lead supplied. Software provided with the unit allows automatic determination of the thermal conductivity of the sample over a range of mean temperatures. Both graphical and numeric hard copy can be obtained if a suitable printer is available.

I claim:

1. A heat flow transducer in combination with a specimen material for measuring thermal conductivity of the specimen material, said transducer being located thermally in series with said specimen material, said transducer comprising:
   a core of heat resistive material having opposed faces, comprising a first heat flow path;
   two heat conductive plates in thermal contact with the opposed faces;
   at least one thermoelectric cooler set into a corresponding aperture in the core comprising at least one thermal resistance comprising a second heat flow path between the conductive plates in parallel with the first heat flow path; and
   electrical interconnections to said at least one thermoelectric cooler to derive an electrical response to a thermal flux through the transducer from one plate to the other, said heat resistive material having a selected thermal conductivity, said selected thermal conductivity comprising a means for adjusting the heat flow sensitivity of said transducer.

2. A heat flow transducer as claimed in claim 1 wherein there is a plurality of thermoelectric coolers and the said electrical interconnections are effective to add serially the electrical outputs of the thermoelectric coolers.

3. A heat flow transducer as claimed in claim 1 wherein the transducer has an area which is the area of the transducer between the plates, and there is a thermoelectric cooler area which is the collective area of said at least one thermoelectric cooler, and a ratio of the transducer area to the thermoelectric cooler area is greater than 15:1.

4. A heat flow transducer as claimed in claim 3 wherein the ratio of the transducer area to the thermoelectric cooler area is greater than 21:1.

5. A heat flow transducer as claimed in claim 1 wherein the heat resistive material is at least one of a settable fluid and a curable fluid which is moulded around said at least one thermoelectric cooler and allowed to solidify.

6. A heat flow transducer as claimed in claim 5 wherein the heat resistive material is silicone rubber.

7. An apparatus for the measurement of thermal conductivity of the specimen material, the apparatus including a heat flow transducer as claimed in claim 1 and comprising:
   a heat insulated chamber,
   a mount within the chamber for mounting said specimen material; heating means for supplying heat to one surface of the specimen material; and
   cooling means for withdrawing heat from the opposite surface of the specimen material; said heat flow transducer being mounted in thermal contact with one of said surfaces of the specimen material.

8. A heat flow transducer as claimed in claim 1 wherein the heat resistive material is a curable fluid characterized in that it is mouldable around said at least one thermoelectric cooler and then capable of solidifying.

9. A heat flow transducer as claimed in claim 8 wherein the heat resistive material is an epoxy resin.

10. A heat flow transducer for measuring thermal conductivity of a specimen material, said transducer comprising:
   a core of heat resistive material having opposed faces, comprising a first heat flow path;
   two heat conductive plates in thermal contact with the opposed faces;

at least one thermoelectric cooler set into a corresponding aperture in the core comprising at least one thermal resistance comprising a second heat flow path between the conductive plates in parallel with the first heat flow path, each said at least one thermoelectric cooler comprising a matrix of semiconductor thermoelectric couples connected electrically in series and thermally in parallel; and electrical interconnections to said at least one thermoelectric cooler to derive an electrical response to a thermal flux through the transducer from one plate to the other, said heat resistive material having a selected thermal conductivity, said selected thermal conductivity comprising a means for adjusting the heat flow sensitivity of said transducer.

11. A heat flow transducer as claimed in claim 10 wherein there is a plurality of thermoelectric coolers and said electrical interconnections are effective to add serially the electrical outputs of the thermoelectric coolers.

12. A heat flow transducer as claimed in claim 10 wherein the transducer has an area which is the area of the transducer between the plates, and there is a thermoelectric cooler area which is the collective area of said at least one thermoelectric cooler, and a ratio of the transducer area to the thermoelectric cooler area is greater than 15:1.

13. A heat flow transducer as claimed in claim 12 wherein the ratio of the transducer area to the thermoelectric cooler area is greater than 20:1.

14. A heat flow transducer as claimed in claim 10 wherein the heat resistive material is at least one of a settable fluid and a curable fluid which is moulded around said at least one thermoelectric cooler and allowed to solidify.

15. A heat flow transducer as claimed in claim 14 wherein the heat resistive material is silicone rubber.

* * * * *